US008363298B2

(12) United States Patent
Ryytty

(10) Patent No.: US 8,363,298 B2
(45) Date of Patent: Jan. 29, 2013

(54) DIFFRACTION GRATINGS WITH TUNABLE EFFICIENCY

(75) Inventor: Pasi Ryytty, Espoo (FI)

(73) Assignee: Nokia Corporation, Espoo (FI)

(*) Notice: Subject to any disclaimer, the term of this patent is extended or adjusted under 35 U.S.C. 154(b) by 334 days.

(21) Appl. No.: 12/223,750

(22) PCT Filed: Feb. 27, 2006

(86) PCT No.: PCT/IB2006/000400
§ 371 (c)(1),
(2), (4) Date: Feb. 2, 2009

(87) PCT Pub. No.: WO2007/096687
PCT Pub. Date: Aug. 30, 2007

(65) Prior Publication Data
US 2009/0296218 A1  Dec. 3, 2009

(51) Int. Cl.
*G02F 1/01* (2006.01)
*G02B 5/18* (2006.01)
(52) U.S. Cl. .............. 359/245; 359/573; 369/112.02
(58) Field of Classification Search .......... 359/578, 359/665, 666, 245, 573; 369/112.02
See application file for complete search history.

(56) References Cited

U.S. PATENT DOCUMENTS 4,660,938 A * 4/1987 Kazan ........................... 359/245
4,701,021 A    10/1987 Le Pesant
5,659,330 A    8/1997 Sheridon
7,675,591 B2 * 3/2010 Kim et al. ..................... 349/106
2004/0109234 A1  6/2004 Levola
2004/0191127 A1  9/2004 Kornblit et al.
2008/0239925 A1 * 10/2008 Kuiper et al. ............ 369/112.02

FOREIGN PATENT DOCUMENTS

EP  1468728 A2  10/2004
JP  2004299051    10/2004

OTHER PUBLICATIONS

Extended European Search Report dated Jul. 29, 2010 in corresponding European Patent Application No. 06744427.3 (6 pages).
English translation of Japanese Office Action mailed Aug. 3, 2010 in parallel Japanese Patent Application No. 2008-555885 (3 pages).
English Abstract of Japanese Unexamined Patent Publication No. 2004-299051, Lucent Technologies Inc., Oct. 28, 2004 (1 page).

* cited by examiner

*Primary Examiner* — Audrey Y Chang
(74) *Attorney, Agent, or Firm* — Alston & Bird LLP

(57) ABSTRACT

The specification and drawings present a new method, apparatus and software product for modulation of the optical intensity using electro-wetting (EW) diffraction gratings in the electronic devices with an electrical control signal. The EW diffraction gratings can be components of an element (e.g., a display) of the electronic device. Applications may include but are not limited to color displays, projection displays, front illuminating displays, field sequential displays, auto-stereoscopic displays, etc. Also, applications in areas other than displays are possible.

33 Claims, 7 Drawing Sheets

Wetting surface

Non - wetting surface

DIFFRACTION GRATINGS WITH TUNABLE EFFICIENCY

CROSS-REFERENCE TO RELATED APPLICATION

This application is a US National Stage Application from PCT International Application No. PCT/IB2006/000400 filed on Feb. 27, 2006 (International Publication No. WO2007/096687).

TECHNICAL FIELD

The present invention relates generally to electronic devices and, more specifically, to a modulation of optical intensity and/or redirection of optical path with an electrical control signal using electro-wetting (EW) diffraction gratings in the electronic devices.

BACKGROUND ART

There are many techniques which can be utilized for light intensity, direction modulation, phase modulation, optical switching, optical logic, etc., which may include (but are not limited to): electro-optical methods, liquid crystals, acousto-optics, non-linear optics methods, magneto-optics, etc. There are many technologies suitable for use in display panel applications, e.g., the most typical being LCDs (liquid crystal displays). The U.S. Pat. No. 5,659,330 "Electrocapillary Color Display Sheet" by N. K. Sheridon describes another method for displays which uses electro-wetting to control the shape of dyed liquid droplets that are placed inside a capillary sheet. The display requires a large number of separate liquid droplets to be created and maintained rigidly in an array formation, which might not be possible in practical applications. Also, light modulation mechanism in the above reference (U.S. Pat. No. 5,659,330) requires the shape of the droplets to be varied macroscopically, which limits the achievable refresh rate of the display.

Another US patent application No. 2004/0109234 "Electrically Tunable Diffractive Grating Element" by T. Levola describes a deformable diffractive grating structure, where a preformed, basic surface relief of the grating is composed of dielectric and deformable viscoelastic material, which can be electrically tuned in shape to adjust the diffraction properties of the grating.

DISCLOSURE OF THE INVENTION

According to a first aspect of the invention, an optical device, comprises: a diffraction grating made of dielectric optical material with an index of refraction n and comprising a first surface with a structure having a structure height h and a structure period d, and a second surface; wherein the first surface is covered by hydrophobic material which reduces wettability of the diffraction grating for pre-selected liquids; a uniform liquid layer with the index of refraction k comprised of one of the pre-selected liquids, wherein the indexes of refraction n and k are substantially equal, the uniform liquid layer is disposed on the first surface of the diffraction grating, wherein parameters of the optical device are chosen such that: a) the uniform liquid layer does not enter air pocket area formed below a top of the structure when there is no an electric field created in the uniform liquid layer, and b) the uniform liquid layer enters by a predetermined value the air pocket area formed below the top of the structure, due to a capillary effect and increased wettability of the first surface, when there is a predetermined electric field created in the uniform liquid layer, thus changing a diffraction efficiency of the diffraction grating for varying an optical intensity of an optical beam transmitted or reflected by the diffraction grating; and an electrode layer of electrically conducting material formed on the second surface, for creating the electric field.

According further to the first aspect of the invention, the electric field or the predetermined electric field may be created by applying a voltage between the uniform liquid layer and the electrode layer.

Further according to the first aspect of the invention, the optical device may further comprise: a further electrode layer of electrically conducting material formed on a uniform liquid layer, wherein the electric field or the predetermined electric field is created by applying a voltage between the further electrode layer and the electrode layer.

Still further according to the first aspect of the invention, the parameters of the optical device may comprise the structure period d, a surface tension of liquid in the uniform liquid layer and the wettability of the hydrophobic material.

According further to the first aspect of the invention, the periodic lines of the diffraction grating may have a rectangular, a slanted profile or a smoothly varying wall profile according to a predetermined algorithm.

According still further to the first aspect of the invention, the electrode layer may be transparent to an optical beam.

According further still to the first aspect of the invention, the uniform liquid layer may be dyed with a predetermined optical color or a color filter may be used in front of the uniform liquid layer such that the diffraction grating only transmits the optical beam with the predetermined color.

According yet further still to the first aspect of the invention, the parameters of the diffraction grating may be chosen such that the diffraction grating supports only first and zero order transmission diffraction modes of the transmitted optical beam transmitted through the diffraction grating, wherein the zero order transmission diffraction mode component of the transmitted optical beam is blocked and the first order transmission diffraction mode component of the transmitted optical beam is directed towards a user of the optical device. Further, the optical intensity of the first order transmission diffraction mode component of the transmitted optical beam may be varied by changing the diffraction efficiency of the diffraction grating by the electric field.

Yet still further according to the first aspect of the invention, the optical beam may be received by the first surface of the diffraction grating.

Still yet further according to the first aspect of the invention, the air escapes from the air pocket area, and the air pocket area may be completely filled by the uniform liquid layer when an electric field, created in the uniform liquid layer, exceeds a threshold electric field.

Still further still to the first aspect of the invention, the air may escape from the air pocket area and the air pocket area may be filled by the uniform liquid layer by a predetermined value when an electric field, created in the uniform liquid layer, is smaller than a threshold electric field, and wherein the periodic lines of the diffraction grating have a smoothly varying wall profile according to a predetermined algorithm.

According further still to the first aspect of the invention, the air in the air pocket area may not be removable from the air pocket area, and the air pocket area may be filled by the uniform liquid layer by a predetermined value when an electric field, created in the uniform liquid layer, is larger than a threshold electric field, and wherein the predetermined value is defined by an equilibrium condition using a pressure provided by the air in the air pocket.

According to a second aspect of the invention, an optical intensity of an optical beam propagating through or reflected from an optical device in an electronic device, comprises the steps of: receiving the optical beam by the optical device, wherein the optical device comprises: a diffraction grating made of dielectric optical material with an index of refraction n and comprising a first surface with a structure having a structure height h and a structure period d, and a second surface; wherein the first surface is covered by hydrophobic material which reduces wettability of the diffraction grating for pre-selected liquids; an electrode layer of electrically conducting material formed on the second surface, for creating an electric field; a uniform liquid layer with the index of refraction k comprised of one of the pre-selected liquids, wherein the indexes of refraction n and k are substantially equal, the uniform liquid layer is disposed on the first surface of the diffraction grating, wherein parameters of the optical device are chosen such that: a) the uniform liquid layer does not enter air pocket area formed below a top of the structure when there is no the electric field created in the uniform liquid layer, and b) the uniform liquid layer enters by a predetermined value the air pocket area formed below the top of the structure, due to a capillary effect and increased wettability of the first surface, when there is a predetermined electric field created in the uniform liquid layer, thus changing a diffraction efficiency of the diffraction grating for varying an optical intensity of an optical beam transmitted or reflected by the diffraction grating; and varying the predetermined electric field, thus further changing the predetermined value by which the uniform liquid layer enters the air pocket area causing a further change of the diffraction efficiency of the diffraction grating, therefore varying the optical intensity of the optical beam propagating through or reflected from the optical device.

According further to the second aspect of the invention, the electric field or the predetermined electric field may be created by applying a voltage between the uniform liquid layer and the electrode layer.

Further according to the second aspect of the invention, the optical device may further comprise: a further electrode layer of electrically conducting material formed on a uniform liquid layer, wherein the electric field or the predetermined electric field may be created by applying a voltage between the further electrode layer and the electrode layer.

Still further according to the second aspect of the invention, the parameters of the optical device may comprise the structure period d, a surface tension of liquid in the uniform liquid layer and the wettability of the hydrophobic material.

According further to the second aspect of the invention, the periodic lines of the diffraction grating may have a rectangular, a slanted profile or a smoothly varying wall profile according to a predetermined algorithm.

According still further to the second aspect of the invention, the electrode layer may be transparent to an optical beam.

According further still to the second aspect of the invention, the uniform liquid layer may be dyed with a predetermined optical color or a color filter may be used in front of the uniform liquid layer such that the diffraction grating only transmits the optical beam with the predetermined color.

According yet further still to the second aspect of the invention, the parameters of the diffraction grating may be chosen such that the diffraction grating supports only first and zero order transmission diffraction modes of the transmitted optical beam transmitted through the diffraction grating, wherein the zero order transmission diffraction mode component of the transmitted optical beam is blocked and the first order transmission diffraction mode component of the transmitted optical beam is directed towards a user of the optical device. Further, the optical intensity of the first order transmission diffraction mode component of the transmitted optical beam may be varied by changing the diffraction efficiency of the diffraction grating by the electric field.

Yet still further according to the second aspect of the invention, the optical beam may be received by the first surface of the diffraction grating.

Still yet further according to the second aspect of the invention, the air may escape from the air pocket area and the air pocket area may be completely filled by the uniform liquid layer when an electric field, created in the uniform liquid layer, exceeds a threshold electric field, and wherein said periodic lines of said diffraction grating have a smoothly varying wall profile according to a predetermined algorithm.

Still further still according to the second aspect of the invention, the air may escape from the air pocket area, and the air pocket area may be filled by the uniform liquid layer by a predetermined value when an electric field, created in the uniform liquid layer, is smaller than a threshold electric field, and wherein the periodic lines of the diffraction grating have a smoothly varying wall profile according to a predetermined algorithm.

Yet further still according to the second aspect of the invention, the air in the air pocket area may not be removable from the air pocket area, and the air pocket area may be filled by the uniform liquid layer by a predetermined value when an electric field, created in the uniform liquid layer, may be larger than a threshold electric field, and wherein the predetermined value may be defined by an equilibrium condition using a pressure provided by the air in the air pocket.

According to a third aspect of the invention, a computer program product comprises: a computer readable storage structure embodying computer program code thereon for execution by a computer processor with the computer program code characterized in that it includes instructions for performing the steps of the second aspect of the invention as being performed by any component of the electronic device.

According to a fourth aspect of the invention, an electronic device comprises: at least one optical device, which comprises: a diffraction grating made of dielectric optical material with an index of refraction n and comprising a first surface with a structure having a structure height h and a structure period d, and a second surface; wherein the first surface is covered by hydrophobic material which reduces wettability of the diffraction grating for pre-selected liquids; an electrode layer of electrically conducting material formed on the second surface, for creating an electric field; a uniform liquid layer with the index of refraction k comprised of one of the pre-selected liquids, wherein the indexes of refraction n and k are substantially equal, the uniform liquid layer is disposed on the first surface of the diffraction grating, wherein parameters of the optical device are chosen such that: a) the uniform liquid layer does not enter air pocket area formed below a top of the structure when there is no the electric field created in the uniform liquid layer, and, b) the uniform liquid layer enters by a predetermined value the air pocket area formed below the top of the structure, due to a capillary effect and increased wettability of the first surface, when there is a predetermined electric field created in the uniform liquid layer, thus changing a diffraction efficiency of the diffraction grating for varying an optical intensity of an optical beam transmitted or reflected by the diffraction grating; and a component comprising the at least one optical device; and at least one voltage driver, responsive to an intensity selection/modulation signal, for providing an electro-wetting control signal to an optical device in the component for providing an electric field applied between the uniform liquid layer and the electrode layer, thus varying the predetermined electric field and further changing the predetermined value by which the uniform liquid layer enters the air pocket area causing a further change of the diffraction efficiency of the diffraction grating, thus varying the optical intensity of the optical beam propagating through or reflected from the optical device to provide the desired level of the optical intensity.

According further to the fourth aspect of the invention, the element may be a display, the optical device may be a pixel of the display, and the optical intensity modulation signal may be a video signal.

Further according to the fourth aspect of the invention, the element may be a projection display, front illuminating display, a field sequential display or an auto-stereoscopic display.

Still further according to the fourth aspect of the invention, the electronic device may further comprise: an optical intensity selector/switch, responsive to an optical intensity modulation/instruction signal, for providing an intensity selection signal in response to the optical intensity modulation instruction signal, wherein the intensity selection signal indicates a desired level of the optical intensity of reflected from or transmitted through the diffraction grating;

According further to the fourth aspect of the invention, the optical intensity selector/switch and the at least one voltage driver may be combined in one block.

The advantages of various embodiments of the present invention for using electro-wetting (EW) diffraction gratings include (but are not limited to):

Fast response time;

Uniform liquid layer, no special handling needed to create separate droplets;

Tunable pixel intensity; and

High efficiency.

MODES FOR CARRYING OUT THE INVENTION

A new method, apparatus and software product are presented for modulation of optical intensity using electro-wetting (EW) diffraction gratings in the electronic devices with an electrical control signal. The EW diffraction gratings can be components of an element (e.g., a display) of the electronic device. Embodiments of the present invention provide a technical solution for utilizing electro-wetting (EW) to implement variable efficiency diffraction gratings.

For example, one solution is a direct view color display with continuously tunable pixel intensities, e.g., using the EW diffraction grating as a colored pixel, which provides fast response time and refresh rate, as described below. Other applications may be projection displays, front illuminating displays, field sequential displays, auto-stereoscopic displays, etc. Also, applications in areas other than displays are possible as well which can include (but not be limited to) areas utilizing optical beam splitting and/or redirection. One such application may be optical telecommunications, wherein one could use the effect to switch light between, e.g., waveguides in multiplexing applications.

Figure 1A:
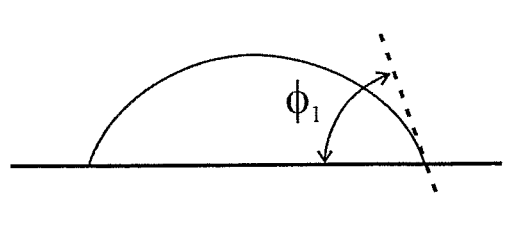
FIGS. 1a and 1b are schematic representations demonstrating surface tension and capillary effect in regard to wettability of a surface.
Figure 1A:
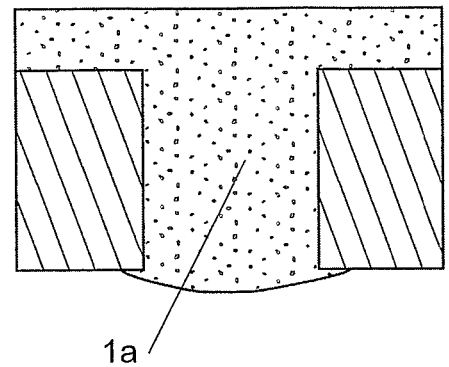
Figure 1B:
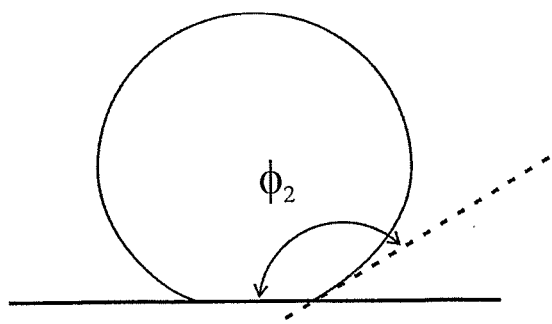
Figure 1B:
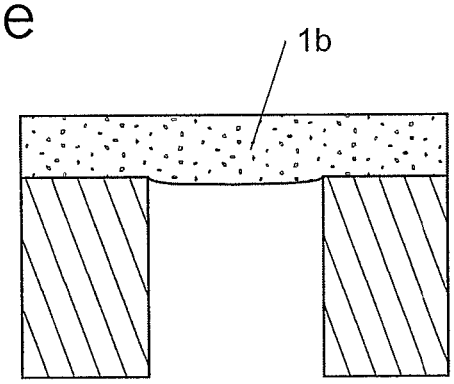

FIGS. 1a and 1b are schematic representations demonstrating surface tension and capillary effect in regard to wettability of a surface. The wettability of a surface is described by so called contact angle ($\phi$). For hydrophilic surfaces, the contact angle is less than 90 degrees, which means that the adhesive force between a liquid and a surface is greater than the cohesive force of the liquid. A drop of water 1a then spreads out on the surface due to adhesion until the cohesive force becomes strong enough, due to an increased surface area, to prevent further spreading of the liquid. Also, the liquid will be drawn into a capillary and will fill it out if the other end is open (see FIG. 1a with the angle $\phi_1$ less than 90 degrees).

On the other hand, if the surface is water repellent, then the contact angle is greater than 90 degrees (angle $\phi_1$ in FIG. 1b). In this case, the cohesive force of the liquid is greater than the surface adhesion and a small droplet 1b is formed. Also, the capillary effect will work in reverse direction and will cause outward "capillary pressure" on the liquid that will prevent it from filling the cavity.

Figure 2A:
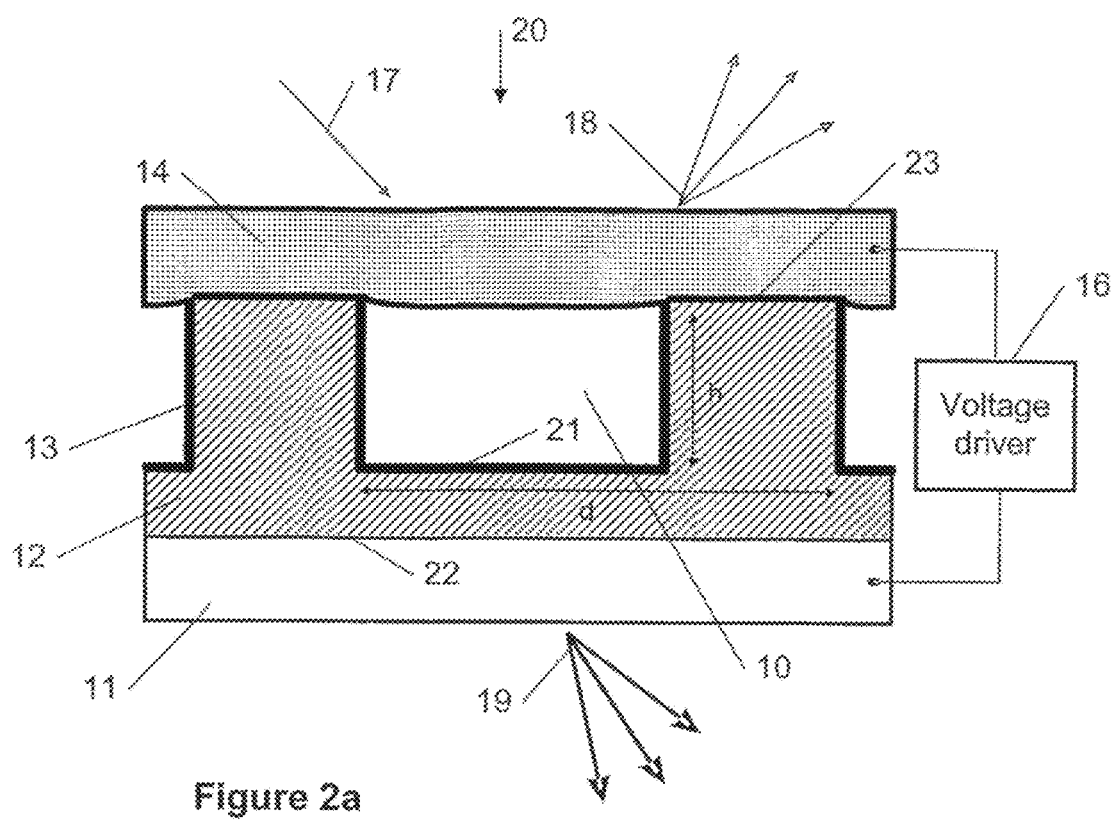
FIGS. 2a and 2b are schematic representations of an optical device with a variable efficiency electro-wetting (EW) diffraction grating for: a) a zero control voltage in FIG. 2a; b) a variable non-zero control voltage in FIG. 2b, according to an embodiment of the present invention.
Figure 2B:
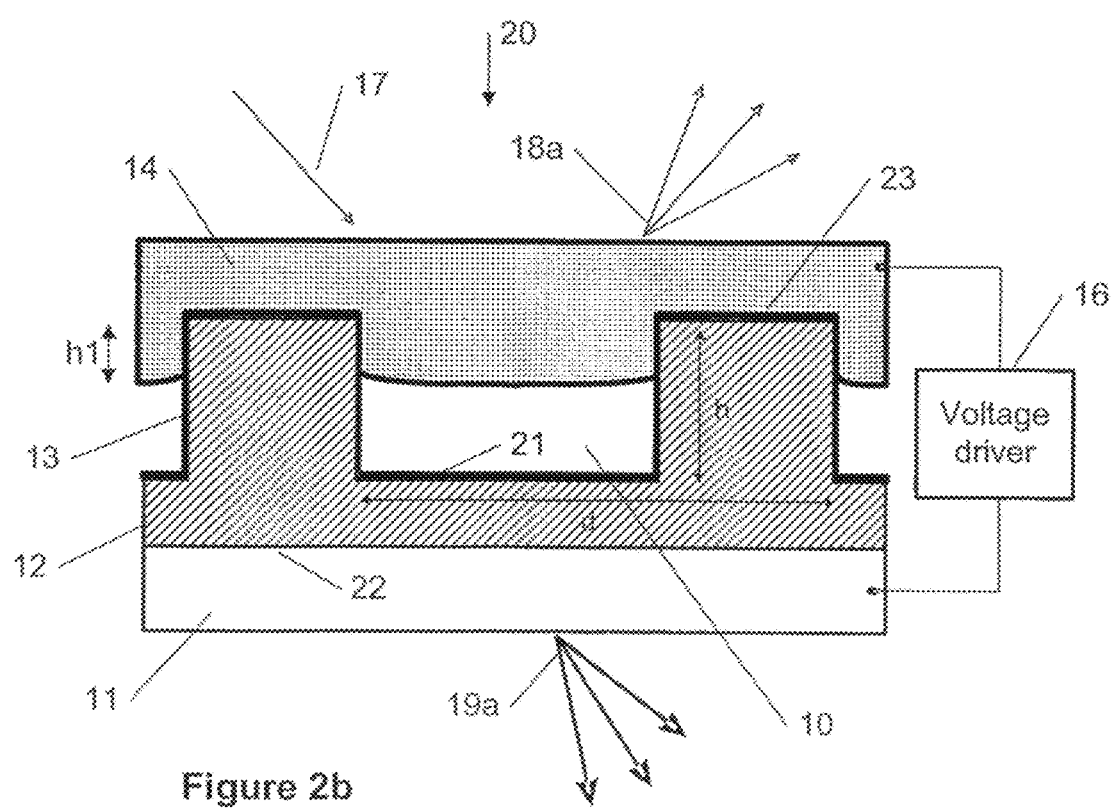

The working principle of the electro-wetting (EW) grating can be understood from FIGS. 2a and 2b showing an example among others of schematic representations of an optical device 20 with a variable efficiency electro-wetting (EW) diffraction grating for: a) a zero control voltage in FIG. 2a; b) a variable non-zero control voltage in FIG. 2b, according to an embodiment of the present invention;

The optical device 20 comprises of a diffraction grating 12 made of a dielectric optical material with an index of refraction n and comprising a first surface 21 with a structure 23 having a structure height h and a structure period d, and a second surface 22. The first surface 21 is covered by hydrophobic material 13, which reduces wettability of the diffraction grating 12 for pre-selected liquids. An electrode layer 11 of electrically conducting material is formed on the second surface 22. The electrode layer 11 can be made of optically transparent or reflecting (e.g., metal) material. Finally, a uniform liquid layer 14 (optionally electrically conducting), with the index of refraction k comprised of one of the mentioned above pre-selected liquids is disposed on the first surface 21 of the diffraction grating 12, wherein the indexes of refraction n and k are substantially equal, i.e. k is selected to closely match the index of refraction of the diffraction grating 12.

One possible index matching liquid/material combination is water and teflon. Both have refractive index around 1.3 and the contact of water on Teflon is greater than 90 degrees (typically around 108 degrees). Another possibility is to use index matching dielectric material which is not normally hydrophobic to the preselected liquid and to coat it with a suitable non-wetting agent. Possible surface treatment agents are (but not limited to), e.g. organosilane compounds or fluorinated polymers.

When there is no electric field applied between the uniform liquid layer 14 and the electrode layer 11 as shown in FIG. 2*a*, the uniform liquid layer 14 does not enter the air pocket area 10 formed below a top of the structure 23. This is facilitated by an appropriate choice of the parameters of the optical device 20. For example, an appropriate choice and balancing of: a) the grating period d of the diffraction grating 12, b) the surface tension of the liquid in the uniform liquid layer 14 and c) the suitable reduction in wettability due to the anti-adhesion treatment (the first surface 21 is covered by the hydrophobic material 13), will prevent the liquid of the uniform liquid layer 14 from entering the air pocket area 10 as shown in FIG. 1*a*. In practice, the critical surface tension of the first surface 21 should be less than the surface tension of the liquid in the uniform liquid layer 14 to facilitate repulsive capillary pressure to be exerted on the liquid. In this case, an incident optical beam 17 that passes through the grating will experience a phase modulation due to the difference between the refractive index n of the diffraction grating 12 and the refractive index of the air pocket area 10 which equals to one. This will lead to splitting of the optical beam 17 into several diffraction orders that propagate in different directions both for a reflected optical beam 18 and for a transmitted optical beam 19.

The optical intensity in given diffraction order depends on the shape of the diffraction grating 12 and on the height h of the modulation region (structure 23). Moreover, the number of allowed diffraction orders depends on the period d of the diffraction grating 12 and can be selected such that only the zero diffraction order (directly reflected or transmitted optical beam) and the first diffraction order are allowed. Furthermore, for a suitable choice of a grating profile of the diffraction grating 12 (e.g., using a rectangular or slanted structures, varying the structure height h, etc.), it is possible to direct most of the optical beam into just the first diffraction order, thus effectively turning off the specularly reflected or directly transmitted optical beam.

Tunability of the diffraction efficiency, i.e., the amount of optical beam directed to a given diffraction order, comes from the utilization of electro-wetting (or electrostatic pressure) to vary the surface height of the liquid in the air pocket area 10. The principle of electro-wetting in well known and utilized, e.g., for moving liquid droplets on surfaces or in capillary spaces (see, e.g., U.S. Pat. No. 5,659,330 "Electrocapillary Color Display Sheet" by N. K. Sheridon).

According to an embodiment of the present invention, a voltage driver 16 is connected to the electrically conducting liquid layer 14 and the electrode layer 11 that can either be optically transparent or reflecting depending on the application. For example, when there is a predetermined electric field applied between the uniform liquid layer 14 and said electrode layer 11 using the voltage driver 16, as shown in FIG. 2*b*, the uniform liquid layer 14 enters by a predetermined value the air pocket area 10 as shown in FIG. 2*b* due to a capillary effect and increased wettability of the first surface 21 caused by applying the predetermined electric field. This changes a diffraction efficiency of the diffraction grating 12 and subsequently changes the optical intensity of the transmitted optical beam 19*a* and/or reflected optical beam 18*a*.

When a sufficiently high voltage (i.e., the electric field provided by the voltage driver 16) is applied, as shown in FIG. 2*b*, such that the electrostatic pressure exerted on the uniform liquid layer 14 by the static electric field exceeds the repulsive capillary pressure, or the contact angle between the liquid and the first surface is reduced below 90 degrees due to electrowetting, the liquid will move deeper inside the air pocket 10. If air inside the air pocket region 10 can escape from the structure, liquid moving into the air pocket region from the uniform liquid layer will then completely fill the grating structure. The required voltage to fill the air pocket 10 with the said liquid depends on and can be modified by tuning the grating period d of the diffraction grating 12, the distance between the bottom electrode 11 and top electrode 14 (conducting liquid), the surface tension of the liquid in the uniform liquid layer 14 and the critical surface tension of the first surface 21.

Because the refractive index k of the liquid is closely matched to the refractive index n of the diffraction grating 12, the structure will then be optically uniform thus effectively destroying the phase modulation of light obtained with a non-filled grating. A subsequent reduction of the voltage below a critical voltage where the capillary pressure exceeds the electrostatic pressure, or the contact angle between the liquid and the first surface 21 becomes greater that 90 degrees, causes a net repulsive force to be exerted on the liquid leading to removal of the liquid from the air pocket region, thus facilitating switching of the diffraction grating between diffracting and non-diffracting (uniform) states. The response time for switching the diffraction grating is small because only a very small modulation of the surface height is needed. For a grating with structure height of 1 μm and liquid front velocity of 10 cm/s, the corresponding response time is approximately 10 μs.

Continuously tunable diffraction efficiency can be obtained by selecting a grating structure where air inside the air pocket region 10 is trapped in the structure. The air pocket then functions as a spring that prevents the liquid from completely filling the grating structure and thus allows controlling the liquid level in air pocket area 10 by varying the applied voltage by the voltage driver 16. Because the refractive index k of the liquid layer 14 is closely matched to the refractive index n of the diffraction grating 12, changing the liquid height directly changes the amount of phase modulation of the optical beam 17 after passing (transmitting or reflecting) through the optical device 20. This in turn leads to changing diffraction efficiency of the diffraction grating 12 and allows to vary the intensity of the optical beam that goes into a given diffraction order.

Figure 3:
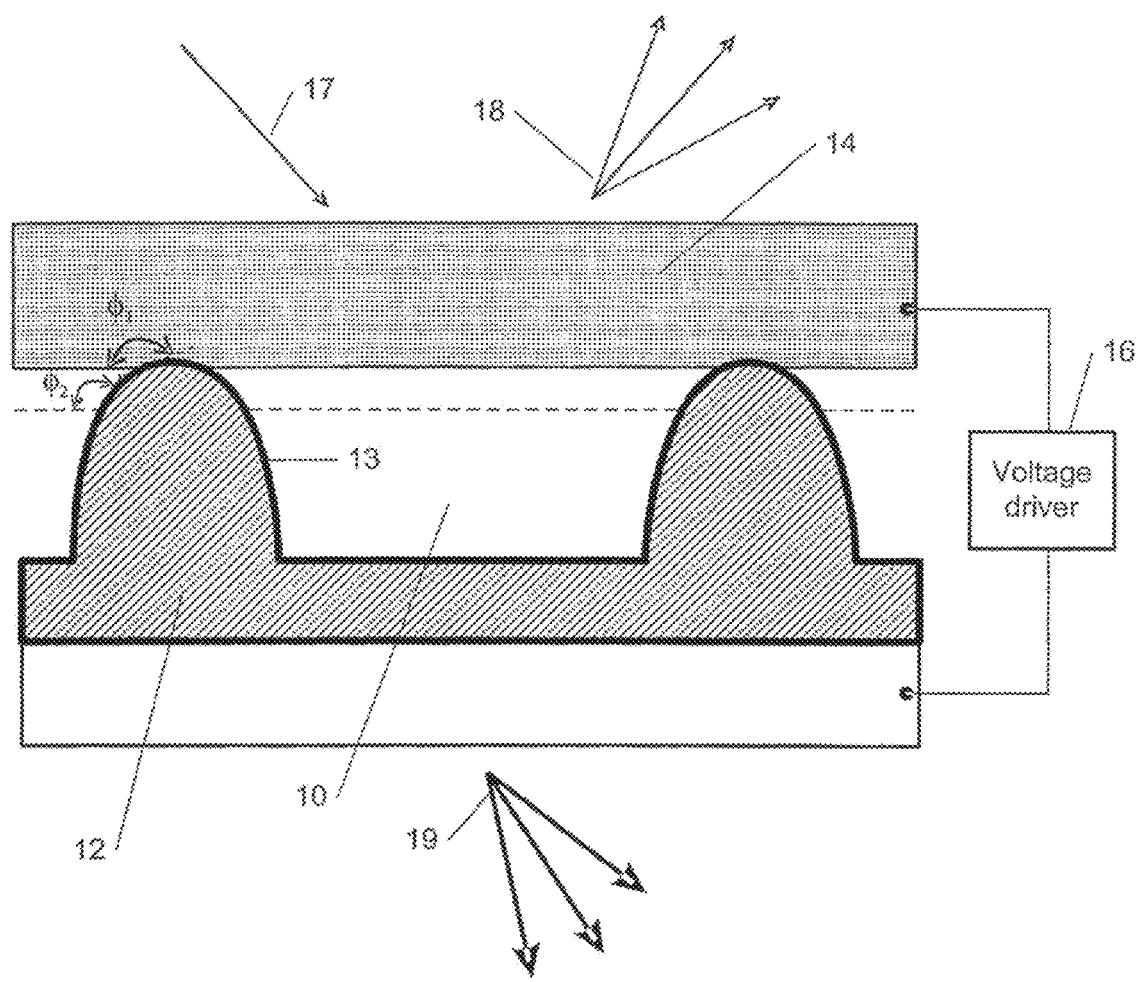
FIG. 3 is a schematic representation of an optical device with a variable efficiency electro-wetting (EW) diffraction grating for a diffraction structure utilizing a varying side wall angle, according to an embodiment of the present invention.

Another possibility for obtaining continuous tunability of the diffraction efficiency, according to an embodiment of the present invention, is to select a grating structure with a varying side wall angle with respect to the surface normal of the uniform liquid layer 14 (e.g., see FIG. 3). In this case, the liquid layer will penetrate into the air pocket region 10 to a depth where the angle between the tangent of the structure surface 13 and the uniform liquid layer equals the contact angle set by the surface tension of the liquid and the critical surface tension of the material used in the structure 12 and/or its surface treatment. The penetration depth, and thus the diffraction efficiency, can then be tuned by applying a voltage between the electrode 11 and the uniform liquid layer 14 that will cause a change in the effective contact angle due to electrowetting.

Examples of FIGS. 2a and 2b use electro-conducting uniform liquid layer 14. But according to a further embodiment of the present invention, it can be also possible to use non-conducting liquids. In this case, the liquid layer can be covered by another electrode (e.g., optionally optically transparent) to form a parallel plate capacitor. When voltage is applied to the plates, there will be a force acting on the liquid, because the total energy of the system is different for filled and unfilled grooves. This is the same effect that is utilized in the U.S. Pat. No. 4,701,021 "Optical Modulator" by Pesant et al. to move a liquid drop between two parallel plate capacitors. In this case the force depends on the dielectric permeability of the liquid, so, if the non-conductive liquids are used in the EW diffraction gratings, it can be advantageous to select a liquid with the dielectric permeability as high as possible.

It is noted that a multiple layer structure can utilize multiple electro-wetting (EW) diffraction grating structures (e.g., similar to diffractions gratings 12) with one (e.g., using grating structures and electrodes on both the top and bottom substrates) or multiple liquid layers (like 14) in between, for modulation of the optical intensity and/or re-directing the optical beam. Also, instead of air some other liquids can be used in the air pocket region 10, as an alternative.

Several practical cases, according to further embodiments of the present invention, are described below.

First, assume that air can escape from the air pocket region, e.g., to the side in the direction of the grating grooves. In this case, the grating will be turned off (completely filled) when the external voltage exceeds a threshold value (which is equivalent to a threshold electric field), at which the electro-wetting effect (or the electrostatic pressure caused by the electric field) causes the contact angle to reduce below 90 degrees.

Second, assume that air can escape from the air pocket region and the external voltage V is smaller than the threshold value (or the threshold electric field). Then, a variable diffraction efficiency using a grating structure with a varying side wall angle (according to a predetermined algorithm) can be achieved as demonstrated in FIG. 3. At a given voltage, the water level will penetrate to a depth at which the angle between a surface tangent and a water front tangent equals the contact angle set by the electro-wetting.

Third, assume that air cannot escape from the air pocket region and the external voltage V is smaller than threshold value (or the threshold electric field). In this case, the penetration depth will be set by an equilibrium condition between the inward electrostatic pressure, the outward capillary pressure and the outward air pressure in the air pocket (e.g., see the example in FIG. 2b).

Figure 4:
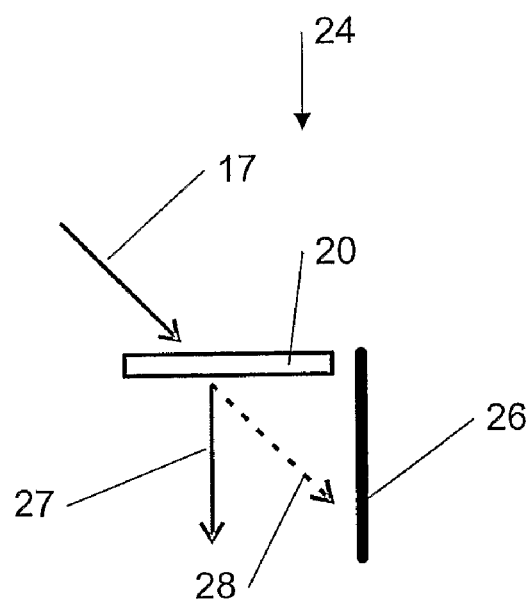
FIG. 4 is a schematic representation showing one possible implementation of a pixel in a back illuminated direct view display using a variable efficiency electro-wetting (EW) diffraction grating, according to an embodiment of the present invention.

FIG. 4 shows one example among others of a schematic representation for a possible implementation of a pixel (e.g., a grey scale) 24 in a back illuminated direct view display using the optical device 20 with the variable efficiency electro-wetting (EW) diffraction grating 12, according to an embodiment of the present invention. Here, the incident optical beam 17 (e.g., the illumination light) that passes through the EW grating is split between zero (beam 28) and first (beam 27) diffraction order. The directly transmitted light 28 is blocked by an absorber 26 that prevents it to be viewed by the user. On the other hand, the first order diffracted light (beam 27) is directed towards the user and can be observed. The pixel intensity can be tuned by changing the diffraction efficiency for the first diffraction order by using tunability of the EW diffraction grating 12, as described above using the embodiments of the present invention, or by using several parallel sub pixels that can be switched on/off independently.

Figure 5:
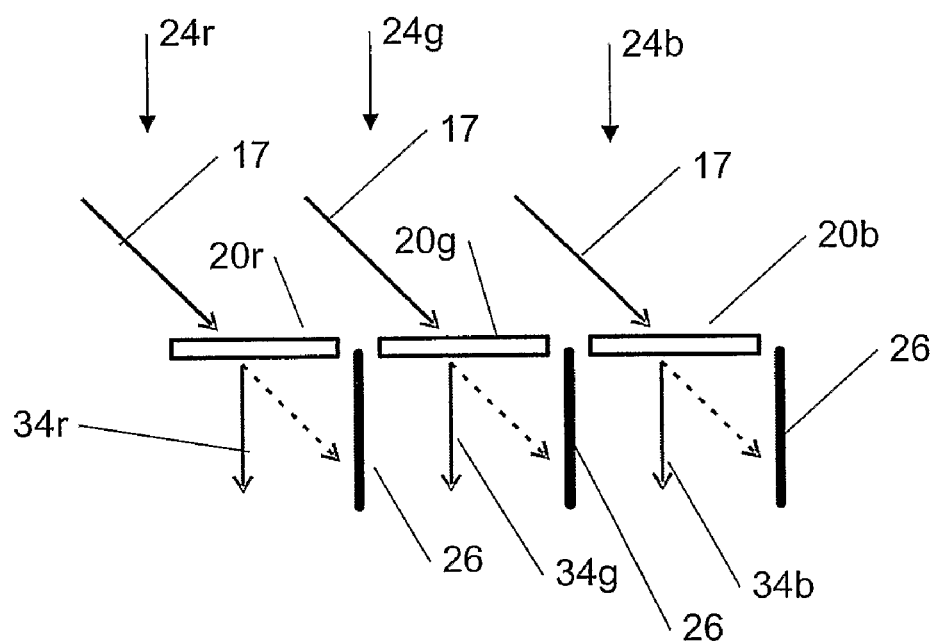
FIG. 5 is a schematic representation showing an implementation of a pixel scheme for a color display, according to an embodiment of the present invention.

A direct extension of the embodiment described in FIG. 4 is an example among others of a color display as depicted in FIG. 5, according to another embodiment of the present invention. Here, the liquid used in the EW diffraction gratings of corresponding optical devices 20r, 20g and 20b in corresponding pixels 24r, 24g and 24b is dyed an appropriate color (e.g., red, green and blue) so that each of the devices 20r, 20g and 20b passes only one wavelength band, which allows to display different colors using, e.g., corresponding transmitted optical beams 34r, 34g and 34b. Alternatively, color filters can be used for selecting the appropriate colors.

Figure 6A:
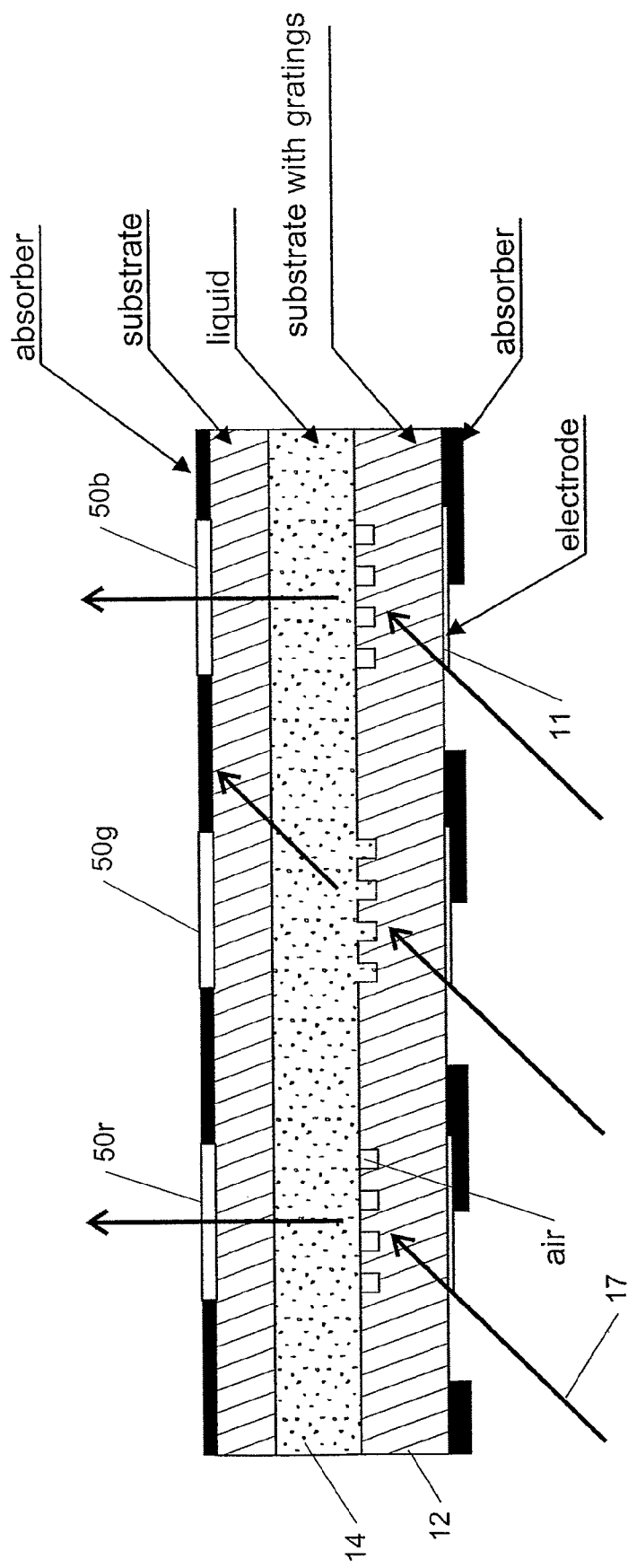
FIGS. 6a through 6c are schematic representations showing various implementation schemes for color displays without a lens array (FIG. 6a) and with the lens array (FIG. 6b-6c), according to embodiments of the present invention.
Figure 6B:
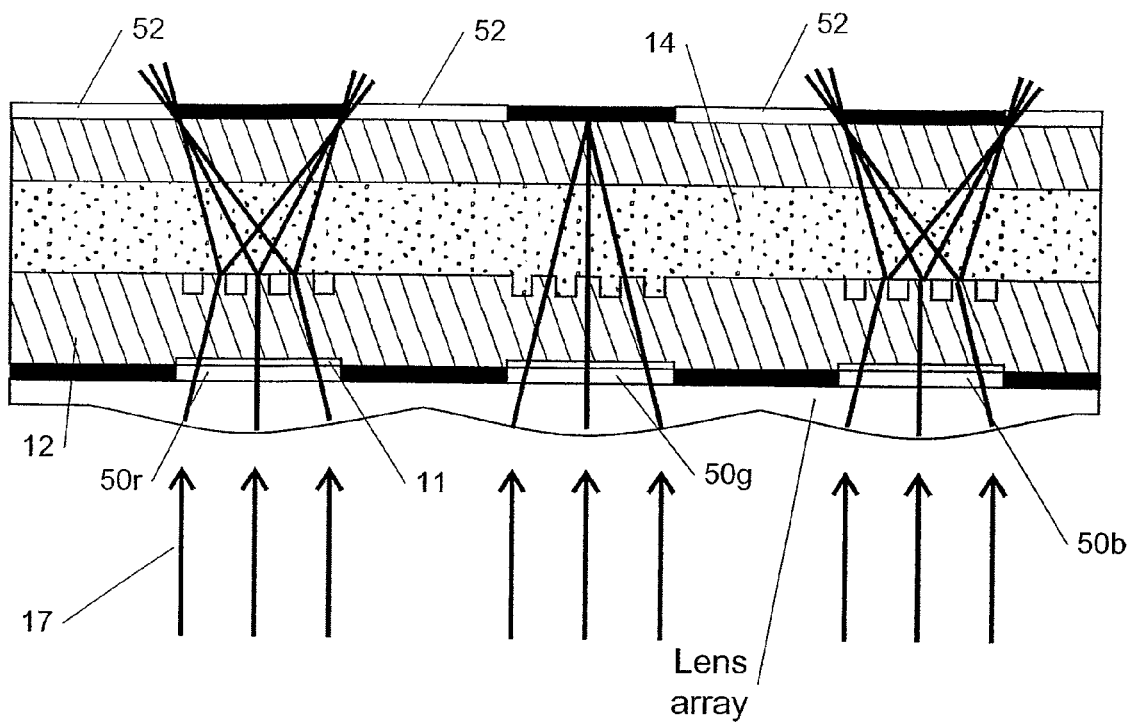
Figure 6C:
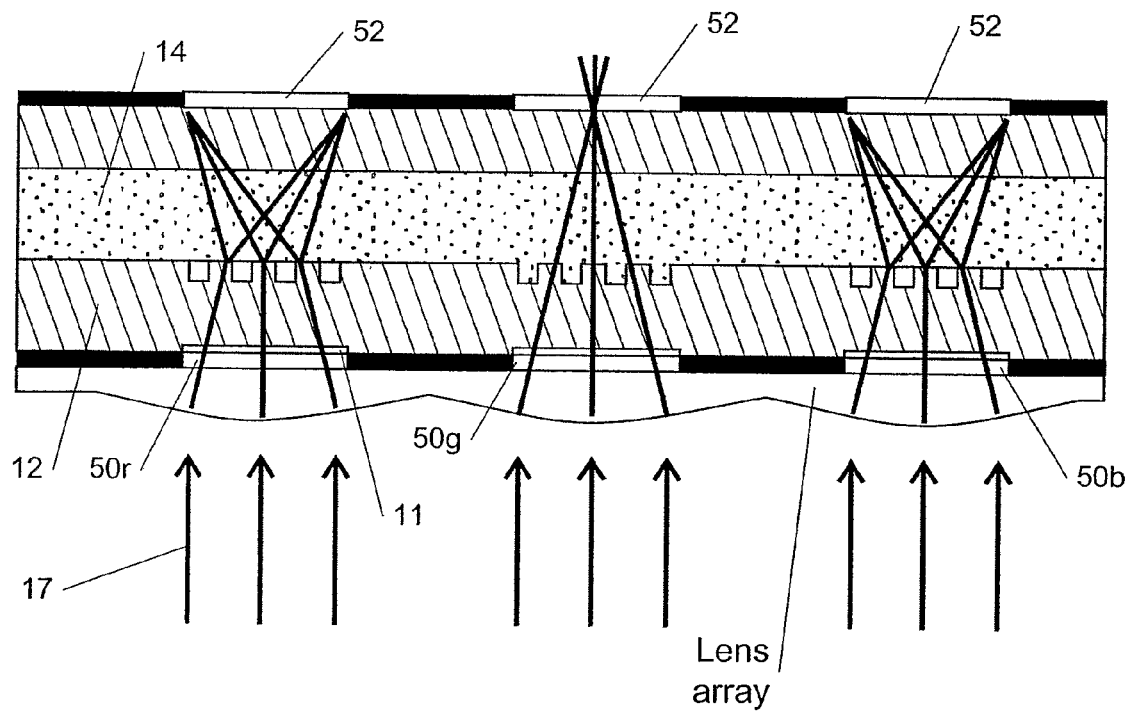

FIGS. 6a through 6c provide further examples among others for various implementation schemes for color displays without lens array (FIG. 6a) and with the lens array (FIGS. 6b-6c) using electro-wetting gratings in direct view display applications, according to embodiments of the present invention.

FIG. 6a shows the arrangement similar to those shown FIGS. 2a, 2b, 3 and 4. In FIG. 6a, the positions of the absorbers (or block absorbers) are chosen differently compared with FIGS. 4 and 5 in order to provide better manufacturability with the incident optical beam 17 as shown. Color filters 50r (red), 50g (green) and 50b (blue) are used in three consecutive pixels, as shown, for color separation. Also an optically transparent electrode 11 is used to provide an electrical contact.

FIGS. 6b and 6c utilize additional lens array. In these applications, it is possible to use longer period gratings with many allowed diffraction orders (instead of just one as in the previous case presented in FIG. 6a). This, together with the focusing action makes them more insensitive to incident parameters of the illuminating light (e.g. incidence angle). In the FIG. 6b case, the grating can have a binary profile that splits light symmetrically to positive and negative diffraction orders (mainly +1 and −1). Thus a pixel is on when there is no voltage applied and off when the voltage is applied. In FIG. 6c the situation is reversed. In both FIGS. 6b and 6c, the color filters 50r (red), 50g (green) and 50b (blue) are used in conjunction with the optically transparent electrode 11, and optically transparent optical windows 52 are used.

Figure 7:
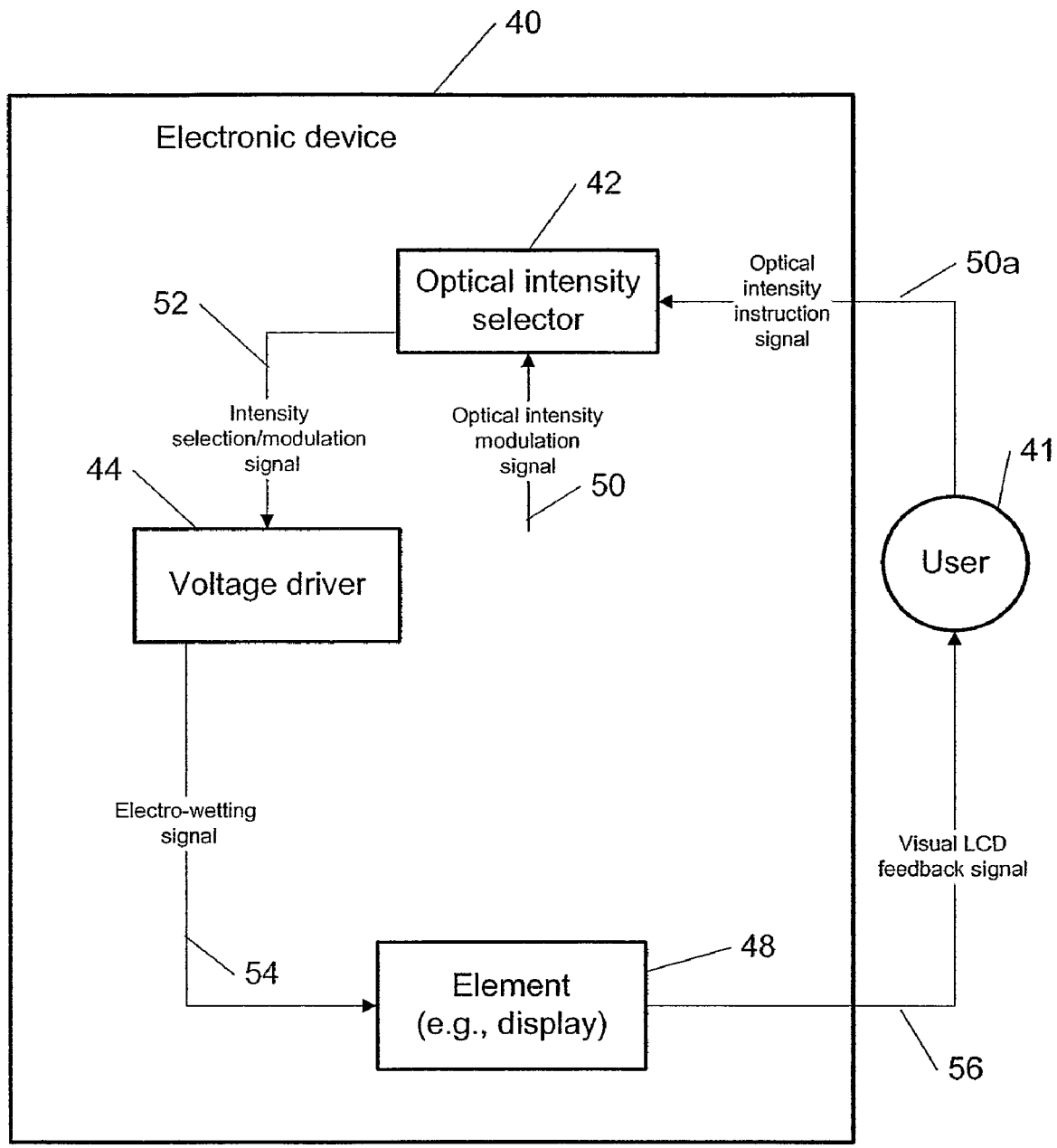
FIG. 7 is a block diagram of an electronic device for providing a modulation of light intensity with an electrical control signal using electro-wetting (EW) diffraction gratings in an element (e.g., a display) of the electronic device, according to an embodiment of the present invention.

FIG. 7 is an example among others of a block diagram of an electronic device 40 for providing a modulation of light intensity with an electrical control signal using electro-wetting (EW) diffraction gratings in an element (e.g., a display) 48 of the electronic device 40, according to an embodiment of the present invention.

An optical intensity modulation signal 50, comprising information on the instantaneous desired value of the light intensity for individual pixels of the display 48, is provided to an optical intensity selector 42. Alternatively, a user 41 can provide an optical instruction signal 50a comprising a desired value for the light intensity of all pixels (e.g., desired average intensity level) of the display 48, thus providing a desired bias.

In response to signals 50 and/or 50a, the optical intensity selector 42 provides an intensity selection signal 52, indicating a desired level of the optical intensity reflected from or transmitted through each pixel of the display 48, to a voltage driver 44. Furthermore, in response to the signal 52, the voltage driver 44 provides an electro-wetting control signal 54 individually to each of the pixels (optical devices, described above by embodiments of the present invention) incorporated in the display 48 for providing the electric field applied between the uniform liquid layer (e.g., 14 in FIG. 2b) and the electrode layer 11 in the mentioned optical devices to further provide the desired level of the optical intensity.

Also, a signal 56 is shown in FIG. 7 as a feedback signal to the user 41 for verifying that the desired average intensity level is satisfactory. It is noted that blocks 42 and 44 can be combined, according to an embodiment of the present invention. In addition it is noted that there can be more than one voltage driver, e.g., to provide modulations and "bias" signals separately.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. An apparatus, comprising:
   a diffraction grating comprising dielectric optical material with an index of refraction n and comprising a first surface with a structure having a structure height h and a structure period d, and a second surface; wherein the first surface is covered by hydrophobic material which reduces wettability of the diffraction grating for pre-selected liquids;
   a uniform liquid layer with the index of refraction k comprised of one of said pre-selected liquids, wherein said indexes of refraction n and k are substantially equal, said uniform liquid layer is disposed on said first surface of said diffraction grating, wherein parameters of said apparatus are chosen such that:
      said uniform liquid layer is configured not to enter an air pocket area formed below a top of said structure when there is no electric field created in said uniform liquid layer, and
      said uniform liquid layer is configured to enter, by a predetermined value, said air pocket area formed below the top of said structure, due to a capillary effect and increased wettability of said first surface, when there is a predetermined electric field created in said uniform liquid layer, for changing a diffraction efficiency of the diffraction grating for varying an optical intensity of an optical beam transmitted or reflected by said diffraction grating; and
   an electrode layer of electrically conducting material formed on said second surface, configured to create said electric field;
   and means for varying said predetermined electric field, for further changing the predetermined value by which said uniform liquid layer enters said air pocket area causing a further change of the diffraction efficiency of the diffraction grating, therefore varying the optical intensity of the optical beam propagating through or reflected from the optical device.

2. The apparatus of claim 1, wherein said electric field is created by applying a voltage between said uniform liquid layer and said electrode layer.

3. The apparatus of claim 1, further comprising: a further electrode layer of electrically conducting material formed on a uniform liquid layer, wherein said electric field is created by applying a voltage between said further electrode layer and said electrode layer.

4. The apparatus of claim 1, wherein said parameters of said apparatus comprise: said structure period d, a surface tension of liquid in the uniform liquid layer and the wettability of said hydrophobic material.

5. The apparatus of claim 1, wherein said diffraction grating has a rectangular profile, a slanted profile or a smoothly varying wall profile according to a predetermined algorithm.

6. The apparatus of claim 1, wherein said electrode layer is transparent to an optical beam.

7. The apparatus of claim 1, wherein said uniform liquid layer is dyed with a predetermined optical color or a color filter is used in front of said uniform liquid layer such that the diffraction grating is configured to transmit only the optical beam with said predetermined color.

8. The apparatus of claim 1, wherein said parameters of said diffraction grating are chosen such that said diffraction grating is configured to support only first and zero order transmission diffraction modes of the transmitted optical beam transmitted through said diffraction grating, wherein the zero order transmission diffraction mode component of said transmitted optical beam is blocked and the first order transmission diffraction mode component of said transmitted optical beam is directed towards a user of said apparatus.

9. The apparatus of claim 8, wherein the optical intensity of said first order transmission diffraction mode component of said transmitted optical beam is varied by changing the diffraction efficiency of the diffraction grating by said electric field.

10. The apparatus of claim 1, wherein said optical beam is received by the first surface of the diffraction grating before it is transmitted or reflected by said diffraction grating.

11. The apparatus of claim 1, wherein air escapes from said air pocket area, and said air pocket area is completely filled by said uniform liquid layer when the electric field created in said uniform liquid layer exceeds a threshold electric field.

12. The apparatus of claim 1, wherein air escapes from said air pocket area and said air pocket area is filled by said uniform liquid layer by a predetermined value when the electric field created in said uniform liquid layer is smaller than a threshold electric field, and wherein periodic lines of said diffraction grating have a smoothly varying wall profile according to a predetermined algorithm.

13. The apparatus of claim 1, wherein air in said air pocket area cannot escape from said air pocket area, and said air pocket area is filled by said uniform liquid layer by a predetermined value when the electric field created in said uniform liquid layer is larger than a threshold electric field, and wherein said predetermined value is defined by an equilibrium condition using a pressure provided by said air in said air pocket.

14. A method, comprising:
   receiving an optical beam by an optical device, wherein said optical device comprises:
   a diffraction grating comprising dielectric optical material with an index of refraction n and comprising a first surface with a structure having a structure height h and a structure period d, and a second surface;
   wherein the first surface is covered by hydrophobic material which reduces wettability of the diffraction grating for pre-selected liquids;
   an electrode layer of electrically conducting material formed on said second surface, for creating an electric field;

a uniform liquid layer with the index of refraction k comprised of one of said pre-selected liquids, wherein said indexes of refraction n and k are substantially equal, said uniform liquid layer is disposed on said first surface of said diffraction grating, wherein parameters of said optical device are chosen such that:

said uniform liquid layer does not enter an air pocket area formed below a top of said structure when there is no electric field created in said uniform liquid layer, and said uniform liquid layer enters, by a predetermined value, said air pocket area formed below the top of said structure, due to a capillary effect and increased wettability of said first surface, when there is a predetermined electric field created in said uniform liquid layer, for changing a diffraction efficiency of the diffraction grating for varying an optical intensity of an optical beam transmitted or reflected by said diffraction grating; and varying said predetermined electric field, for further changing the predetermined value by which said uniform liquid layer enters said air pocket area causing a further change of the diffraction efficiency of the diffraction grating, therefore varying the optical intensity of the optical beam propagating through or reflected from the optical device.

15. The method of claim 14, wherein said electric field is created by applying a voltage between said uniform liquid layer and said electrode layer.

16. The method of claim 14, wherein said optical device comprises a further electrode layer of electrically conducting material formed on a uniform liquid layer, wherein said electric field is created by applying a voltage between said further electrode layer and said electrode layer.

17. A computer program product comprising: a computer readable storage structure embodying computer program code thereon for execution by a computer processor with said computer program, wherein said computer program code comprises instructions for performing the method of claim 14.

18. The method of claim 14, wherein said parameters of said optical device comprises said structure period d, a surface tension of liquid in the uniform liquid layer and the wettability of said hydrophobic material.

19. The method of claim 14, wherein said diffraction grating has a rectangular profile, a slanted profile or a smoothly varying wall profile according to a predetermined algorithm.

20. The method of claim 14, wherein said electrode layer is transparent to an optical beam.

21. The method of claim 14, wherein said uniform liquid layer is dyed with a predetermined optical color or a color filter is used in front of said uniform liquid layer such that the diffraction grating only transmits the optical beam with said predetermined color.

22. The method of claim 14, wherein said parameters of said diffraction grating are chosen such that said diffraction grating supports only first and zero order transmission diffraction modes of the transmitted optical beam transmitted through said diffraction grating, wherein the zero order transmission diffraction mode component of said transmitted optical beam is blocked and the first order transmission diffraction mode component of said transmitted optical beam is directed towards a user of said optical device.

23. The method of claim 22, wherein the optical intensity of said first order transmission diffraction mode component of said transmitted optical beam is varied by changing the diffraction efficiency of the diffraction grating by said electric field.

24. The method of claim 14, wherein said optical beam is received by the first surface of the diffraction grating before it is transmitted or reflected by said diffraction grating.

25. The method of claim 14, wherein air escapes from said air pocket area and said air pocket area is completely filled by said uniform liquid layer when the electric field created in said uniform liquid layer exceeds a threshold electric field.

26. The method of claim 14, wherein air escapes from said air pocket area, and said air pocket area is filled by said uniform liquid layer by a predetermined value when the electric field created in said uniform liquid layer is smaller than a threshold electric field, and wherein periodic lines of said diffraction grating have a smoothly varying wall profile according to a predetermined algorithm.

27. The method of claim 14, wherein air in said air pocket area cannot escape from said air pocket area, and said air pocket area is filled by said uniform liquid layer by a predetermined value when the electric field created in said uniform liquid layer is larger than a threshold electric field, and wherein said predetermined value is defined by an equilibrium condition using a pressure provided by said air in said air pocket.

28. An electronic device, comprising:
at least one optical device, which comprises:
a diffraction grating comprising dielectric optical material with an index of refraction n and comprising a first surface with a structure having a structure height h and a structure period d, and a second surface;
wherein the first surface is covered by hydrophobic material which reduces wettability of the diffraction grating for pre-selected liquids;
an electrode layer of electrically conducting material formed on said second surface, configured to create an electric field;
a uniform liquid layer with the index of refraction k comprised of one of said pre-selected liquids, wherein said indexes of refraction n and k are substantially equal, said uniform liquid layer is disposed on said first surface of said diffraction grating, wherein parameters of said optical device are chosen such that:
said uniform liquid layer is configured not to enter an air pocket area formed below a top of said structure when there is no electric field created in said uniform liquid layer, and
said uniform liquid layer is configured to enter by a predetermined value said air pocket area formed below the top of said structure, due to a capillary effect and increased wettability of said first surface, when there is a predetermined electric field created in said uniform liquid layer, for changing a diffraction efficiency of the diffraction grating for varying an optical intensity of an optical beam transmitted or reflected by said diffraction grating,
and an optical intensity selector/switch configured to, in response to receiving an optical intensity modulation instruction signal, provide an intensity selection/modulation signal to at least one voltage driver, wherein said intensity selection/modulation signal indicates a predetermined level of the optical intensity reflected from or transmitted through said diffraction grating: and
wherein the at least one voltage driver is configured to, in response to receiving the intensity selection/modulation signal, provide an electro-wetting control signal to the optical device for providing an electric field applied between said uniform liquid layer and said electrode layer for varying said predetermined electric field and further changing the predetermined value by which said uniform liquid layer enters said air pocket area causing a further change of the diffraction efficiency of the diffraction grating, for varying the optical intensity of the optical beam propagating through or reflected from the optical device to provide said predetermined level of the optical intensity.

29. The electronic device of claim 28, wherein said electronic device is a display, and said at least one optical device is a pixel of said display.

30. The electronic device of claim 28, wherein said electronic device is a projection display, front illuminating display, a field sequential display or an auto-stereoscopic display.

31. The electronic device of claim 28 wherein the optical intensity selector/switch and the at least one voltage driver are combined in one block.

32. An apparatus comprising:
   means for receiving an optical beam by an optical device, wherein said optical device comprises:
   diffraction means comprising dielectric optical material with an index of refraction n and comprising a first surface with a structure having a structure height h and a structure period d, and a second surface;
   wherein the first surface is covered by hydrophobic material which reduces wettability of the diffraction means for pre-selected liquids;
   means for electrical conducting formed on said second surface, for creating an electric field;
   liquid means with the index of refraction k comprised of one of said pre-selected liquids, wherein said indexes of refraction n and k are substantially equal, said liquid means is disposed on said first surface of said diffraction means, wherein parameters of said optical device are chosen such that:
   said liquid means does not enter an air pocket area formed below a top of said structure when there is no electric field created in said liquid means, and
   said liquid means enters, by a predetermined value, said air pocket area formed below the top of said structure, due to a capillary effect and increased wettability of said first surface, when there is a predetermined electric field created in said liquid means, for changing a diffraction efficiency of the diffraction means for varying an optical intensity of an optical beam transmitted or reflected by said diffraction means; and
   means for varying said predetermined electric field, for further changing the predetermined value by which said liquid means enters said air pocket area causing a further change of the diffraction efficiency of the diffraction means, therefore varying the optical intensity of the optical beam propagating through or reflected from the optical device.

33. The apparatus of claim 32, wherein said liquid means is a uniform liquid layer, said diffraction means is a diffraction grating and said means for electrical conducting is a an electrode layer of electrically conducting material.

* * * * *

UNITED STATES PATENT AND TRADEMARK OFFICE
CERTIFICATE OF CORRECTION

PATENT NO.         : 8,363,298 B2
APPLICATION NO.    : 12/223750
DATED              : January 29, 2013
INVENTOR(S)        : Ryytty Page 1 of 1

It is certified that error appears in the above-identified patent and that said Letters Patent is hereby corrected as shown below:

In the Claims:

Column 11,
Line 52, "said diffraction grating; and" should read --said diffraction grating;--.

Column 16,
Lines 27 and 28, "electrical conducting is a an electrode layer" should read
--electrical conducting is an electrode layer--.

Signed and Sealed this
Fourteenth Day of May, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,363,298 B2  Page 1 of 1
APPLICATION NO. : 12/223750
DATED : January 29, 2013
INVENTOR(S) : Pasi Ryytty It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 872 days.

Signed and Sealed this

First Day of September, 2015

Michelle K. Lee
*Director of the United States Patent and Trademark Office*